United States Patent [19]
Gusavage et al.

[11] Patent Number: 5,994,420
[45] Date of Patent: Nov. 30, 1999

[54] FOAM AND PROCESS FOR PRODUCING A CARBON DIOXIDE BLOWING AGENT

[75] Inventors: Gerald G. Gusavage, Lancaster, Pa.; Henry G. Schirmer, Spartanburg, S.C.; Thomas A. Hessen, Ephrata, Pa.

[73] Assignee: Cryovac, Inc., Duncan, S.C.

[21] Appl. No.: 08/968,672

[22] Filed: Nov. 12, 1997

Related U.S. Application Data

[60] Continuation of application No. 08/835,677, Apr. 9, 1997, abandoned, which is a division of application No. 08/573,812, Dec. 18, 1995, Pat. No. 5,670,552.

[51] Int. Cl.⁶ ..................................................... C08J 9/08
[52] U.S. Cl. ............................... 521/91; 521/79; 521/81; 521/97; 521/146; 521/154
[58] Field of Search ................................. 521/79, 81, 91, 521/97, 146, 154

[56] References Cited

U.S. PATENT DOCUMENTS

| | | | |
|---|---|---|---|
| 4,344,710 | 8/1982 | Johnson et al. | 366/76 |
| 4,424,287 | 1/1984 | Johnson et al. | 521/74 |
| 4,454,086 | 6/1984 | Corbett et al. | 264/53 |
| 4,529,740 | 7/1985 | Trainor | 521/84 |
| 4,596,832 | 6/1986 | Ariga et al. | 521/58 |
| 4,728,674 | 3/1988 | Wroczynski | 521/90 |
| 4,847,148 | 7/1989 | Schirmer | 428/332 |
| 4,935,089 | 6/1990 | Schirmer | 156/272 |
| 5,118,561 | 6/1992 | Gusavage et al. | 428/304 |
| 5,128,196 | 7/1992 | Luetkens, Jr. et al. | 428/213 |
| 5,250,577 | 10/1993 | Welsh | 521/79 |
| 5,269,987 | 12/1993 | Reedy et al. | 264/50 |
| 5,286,429 | 2/1994 | Blythe et al. | 265/51 |
| 5,288,740 | 2/1994 | Park et al. | 521/58 |
| 5,302,624 | 4/1994 | Reedy et al. | 421/81 |
| 5,330,596 | 7/1994 | Gusavage et al. | 156/78 |
| 5,422,378 | 6/1995 | Vo | 521/79 |

FOREIGN PATENT DOCUMENTS

| | | |
|---|---|---|
| 0 570 222 A1 | 5/1993 | European Pat. Off. . |
| 02 240 145 | 3/1989 | Japan . |
| WO 85/05592 | 6/1994 | WIPO . |

OTHER PUBLICATIONS

Rompp Chemical Dictionary, Prof. Dr. Jurgen Falbe & Prof Dr. Manfred Regitz; Greg Thieme Publishers Stuttgart, New York; 1992; pp. 4168–4169.–Original and Translation enclosed.

Silicones & Technology, A Handbook for Practice, Teaching, & Self–Study, by Andreas Tomanek, Published by Wacker–Chemie GmbH, Munich; pp. 37–40;–Original and Translation enclosed, Jul. 1990.

Primary Examiner—Morton Foelak
Attorney, Agent, or Firm—Thomas C. Lagaly

[57] ABSTRACT

The present invention provides a process for producing thermoplastic foam, including:

(a) melting a thermoplastic polymer to produce a polymer melt;

(b) introducing a carbon dioxide blowing agent into the polymer melt;

(c) adding to the polymer melt one or more additives selected from the group consisting of
   (1) polysiloxane, and
   (2) mineral oil; and (d) extruding and foaming the melted polymer melt, blowing agent, and one or more additives to produce thermoplastic foam.

The resultant thermoplastic foam can be thermoformed into various foamed articles, such as foam packaging trays. The quality of foams made from a carbon dioxide blowing agent, and particularly 100% carbon dioxide, has been found to be substantially improved by adding one or more of the foregoing additives, i.e., polysiloxane, mineral oil and, optionally, polyolefin to the polymer melt during the extrusion and foaming process. Such foams have far less ruptured cells, surface cracks and corrugation than comparable foams made with a carbon dioxide blowing agent but which lack the additives of the present invention.

8 Claims, 1 Drawing Sheet

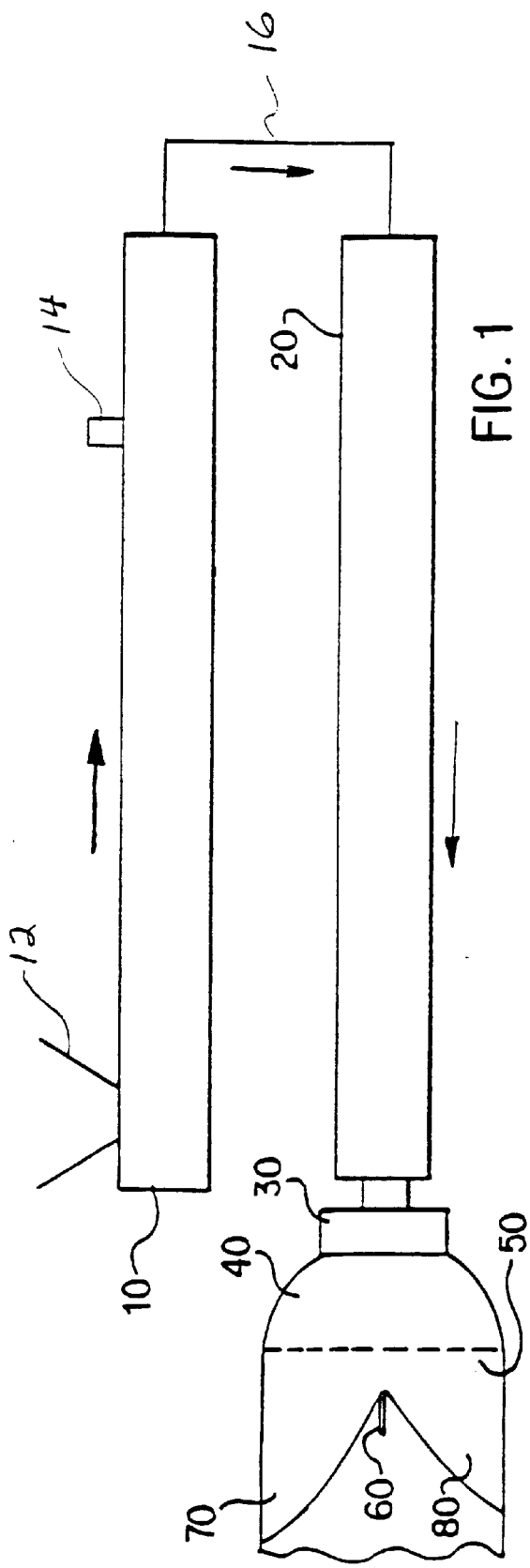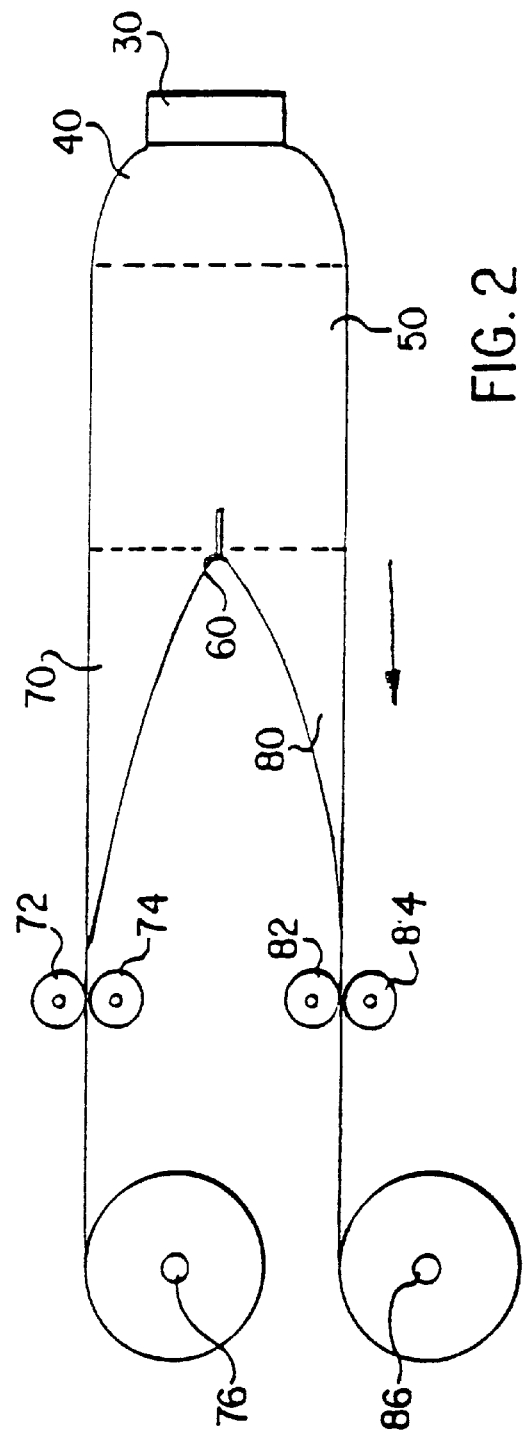

FOAM AND PROCESS FOR PRODUCING A CARBON DIOXIDE BLOWING AGENT

This application is a continuation of application Ser. No. 08/835,677, filed Apr. 9, 1997, now abandoned, which application is a division of application Ser. No. 08/573,812 filed Dec. 18, 1995 which application is now U.S. Pat. No. 5,670,552.

BACKGROUND OF THE INVENTION

The present invention relates to thermoplastic foams and a process for producing thermoplastic foams using a carbon dioxide blowing agent. More particularly, the invention relates to a process for producing foam using a carbon dioxide blowing agent whereby certain additives are used to produce foams of improved quality.

Thermoplastic foams are generally produced in a tandem extrusion process (two extruders in series). The first extruder melts thermoplastic polymer to produce a polymer melt. A high-pressure metering pump delivers a blowing agent to the polymer melt near the end of the first extruder where mixing is initiated prior to entering the second extruder where further mixing and cooling of the blowing agent and polymer melt occurs. After exiting the second extruder, the polymer melt passes through and becomes a foam structure at a die, generally an annular die. The foam structure, generally in the shape of an annular tube, is then stretched over a forming mandrel. The annular tube coming off the mandrel is slit and opened to form a sheet which is then gathered on one or more rolls. The rolled foam sheet is typically aged for a predetermined period of time and then thermoformed into a foamed article, e.g., a packaging tray.

Blowing agents which are most commonly used at present include aliphatic hydrocarbons, e.g., $C_3$–$C_6$ alkanes, and fully or partially halogenated hydrocarbons, e.g., chlorinated and/or fluorinated hydrocarbons. Such conventional blowing agents possess or cause one or more of the following undesirable characteristics: pollution, potential damage to the ozone layer, flammability, poor thermoforming characteristics, brittleness, high cost, and the need for a prolonged aging period to allow some or all of the blowing agent to diffuse from the foam sheet prior to thermoforming. For these reasons, alternatives to the foregoing blowing agents have been sought.

One such alternative is carbon dioxide, which avoids most or all of the foregoing undesirable characteristics of conventional blowing agents. However, due to the extreme volatility and high vapor pressure of carbon dioxide, it is a difficult blowing agent to use, often resulting in a foam sheet with ruptured cells, surface defects (e.g., cracks), and corrugation, i.e., thickness variations within the foam sheet which produce a rippled or wavy surface appearance. Each of the foregoing occurrences detrimentally affect the physical properties of the foam (e.g., strength) as well as the aesthetic qualities thereof.

Accordingly, there is a need in the art for an improved process for producing thermoplastic foam from a carbon dioxide blowing agent which produces a high-quality foam, i.e., one with fewer ruptured cells, surface defects, and corrugation.

SUMMARY OF THE INVENTION

That need is met by the present invention which provides a process for producing thermoplastic foam, comprising:
(a) melting a thermoplastic polymer to produce a polymer melt;
(b) introducing a blowing agent comprising carbon dioxide into the polymer melt;
(c) adding to the polymer melt one or more additives selected from the group consisting of
   (1) polysiloxane, and
   (2) mineral oil; and
(d) extruding and foaming the polymer melt, blowing agent, and one or more additives to produce thermoplastic foam.

Preferably, the blowing agent consists essentially of carbon dioxide, i.e., 100% carbon dioxide. It is also preferred that both polysiloxane and mineral oil are added to the polymer melt. A polyolefin may also be added to the polymer melt as an additional additive.

In accordance with another aspect of the present invention, a thermoplastic foam is provided which comprises:
(a) a polymeric matrix comprising a thermoplastic polymer and one or more materials selected from the group consisting of
   (1) polysiloxane, and
   (2) mineral oil; and
(b) a plurality of cells dispersed throughout the polymeric matrix and containing a blowing agent comprising carbon dioxide, preferably 100% carbon dioxide.

The thermoplastic foam may be formed into a thermoformed article such as a packaging tray or bowl. If desired, an oxygen-barrier film may be adhered to the thermoplastic foam to form a packaging tray or bowl with oxygen-barrier functionality.

The inventors have found that the quality of foams made from a carbon dioxide blowing agent, and particularly 100% carbon dioxide, can be substantially improved by adding one or more of the foregoing additives, i.e., polysiloxane, mineral oil and, optionally, polyolefin, to the polymer melt during the extrusion and foaming process. Such foams have less ruptured cells, surface cracks and corrugation than comparable foams made with a carbon dioxide blowing agent but which lack the additives of the present invention. The improvements of the present invention are particularly significant when 100% carbon dioxide, as opposed to a blend of carbon dioxide and a conventional aliphatic or halogenated blowing agent, is used.

BRIEF DESCRIPTION OF THE DRAWINGS

FIG. 1 is a schematic drawing of a preferred extrusion and foaming system in accordance with the present invention; and FIG. 2 is a schematic drawing of the thermoplastic foam produced in the system of FIG. 1 being cut into two sheets and wound on rolls for subsequent thermoforming.

DETAILED DESCRIPTION OF THE PREFERRED EMBODIMENTS

With reference to FIGS. 1 and 2, a preferred extrusion/foaming system for carrying out the process of the present invention will be described. A thermoplastic polymer, usually in pellet form, is introduced to first extruder 10 via hopper 12. The polymer can be any thermoplastic polymer capable of being foamed, such as polystyrene, polypropylene, or polyethylene terephthalate (e.g., APET, CPET, or PETG). First extruder 10 is a screw-type extruder which heats, mixes, and melts the thermoplastic polymer to form a polymer melt. A nucleating agent, such as citric acid, sodium bicarbonate or talc, is optionally added to first extruder 10 at hopper 12 along with the polymer.

The polymer melt is moved through first extruder 10, cross-over 16, and second extruder 20 in the direction indicated by the arrows in FIG. 1. A carbon dioxide blowing agent, i.e., a blowing agent which comprises carbon dioxide, is introduced to the polymer melt in first extruder 10 at injection port 14. Preferably, the blowing agent consists essentially of carbon dioxide. That is, it is preferred that the blowing agent is 100% carbon dioxide, notwithstanding any minor amounts of impurities or other substances which may also be present in the carbon dioxide. 100% carbon dioxide is preferred in that it avoids the undesirable effects of conventional aliphatic or halogenated hydrocarbon blowing agents as discussed above. If desired, however, major or minor amounts of other blowing agents may be blended with carbon dioxide. Such other blowing agents may include nitrogen or conventional aliphatic or halogenated hydrocarbons, e.g., difluorethane (known commercially as Freon® 152A).

Preferably, the carbon dioxide blowing agent is present in the polymer melt in an amount ranging from about 0.1 to about 15 weight percent, and more preferably from about 1 to about 3 weight percent, the weight percents being based on the total weight of the polymer melt. The carbon dioxide blowing agent is preferably transported to injection port 14 by a pumping system which generates a pressure of between about 5,000 to about 5,500 psi.

The polymer melt is mixed with the carbon dioxide blowing agent in first extruder 10 and then moves through cross-over 16 and into second extruder 20 wherein the polymer melt/blowing agent mixture is further mixed and cooled. Although the exact temperatures and pressures within the first and second extruders will vary depending upon, e.g., the type of polymer, the speed at which the polymer is forced through the extruders, etc., typical pressures within first extruder 10 will range from about 1800 to about 3600 psi while pressures within second extruder 20 will range from about 1800 to about 3100 psi. The temperature in first extruder 10 will usually range from about 250 to about 440° F. while the temperature of second extruder 20 will range from about 150 to about 300 °F.

Second extruder 20 forces the polymer melt/blowing agent mixture through annular die 30. The temperature of annular die 30 typically ranges from about 250 to about 350° F. while the pressure therein ranges from about 800 to 2000 psi. Upon exiting the die, the temperature and pressure of the polymer melt/blowing agent mixture suddenly decreases to ambient temperature and pressure. The decrease in temperature and pressure causes the polymer melt to begin to harden into a polymeric matrix. At the same time, the solubility of the carbon dioxide blowing agent in the polymer greatly decreases. As a result of these two simultaneously-occurring phenomena, the polymer melt/blowing agent mixture is transformed into an annular foam tube 40 by virtue of the expansion of the carbon dioxide blowing agent into a plurality of cells which are dispersed throughout the polymeric matrix.

After exiting die 30, the annular foam tube 40 is stretched over forming and cooling mandrel 50 (shown in phantom). The ratio of the diameter of the foam tube 40 at mandrel 50 to the diameter of the tube as it exits die 30, commonly referred to as the blow-up ratio, may range from about 2:1 to about 10:1, but preferably ranges from about 3.5:1 to about 5:1.

As shown most clearly in FIG. 2, as the annular foam tube 40 comes off of mandrel 50, it is cut into two foam sheets 70 and 80 by slitter 60. Pull rolls 72, 74 and 82, 84 lead sheets 70 and 80, respectively, to winding rolls 76 and 86, respectively. From rolls 76 and 86, foam sheets 70 and 80 will be thermoformed and cut into foamed articles such as, e.g., packaging trays, produce containers, etc. Advantageously, by using a 100% carbon dioxide blowing agent, very little or no aging time is required to allow the blowing agent to diffuse from the cells before thermoforming. With conventional aliphatic or halogenated hydrocarbon blowing agents, aging time, e.g., from three to seven days, is required before the foam sheet can be thermoformed.

In the thermoforming process, a roll of foam sheet is fed through an oven to heat it to near its softening point. The hot sheet is then forced into molds (e.g., tray molds) by vacuum, air pressure, and mechanical pressure. The molded sheet is then fed through a trim press where a punch and die mechanism cuts the individual thermoformed articles from the sheet.

As noted above, carbon dioxide is a very difficult blowing agent to use, primarily due to its extreme volatility and high vapor pressure (at a given temperature). When used in commercial tandem extrusion/foaming systems, such as the one described above, carbon dioxide blowing agents often result in foam sheets having ruptured cells as well as corrugation, surface cracks, and other defects. The inventors have found that when one or more additives selected from the group consisting of polysiloxane, mineral oil, and optionally polyolefin is added to the polymer melt during the extrusion process, the foregoing problems associated with carbon dioxide blowing agents are eliminated or at least substantially reduced. In this manner, high-quality foams can be produced from a carbon dioxide blowing agent.

Although the reasons for the improvement in foam quality through the use of the foregoing additives is not fully understood, it is theorized that the additives serve to minimize heat build-up in the extruders by reducing the sheer energy of the polymer melt. Sheer energy is caused by the frictional forces generated as carbon dioxide moves past polymer molecules when the carbon dioxide is being mixed with and dissolved in the polymer melt. In general, the vapor pressure of the blowing agent is directly proportional, and the viscosity of the polymer melt is inversely proportional, to the temperature of the polymer melt. If the vapor pressure of the carbon dioxide blowing agent is too high and the viscosity of the polymer melt is too low, the carbon dioxide will have a tendency to rapidly diffuse out of the foam upon exiting the die, thereby leading to ruptured cells, corrugation, and a broken or cracked surface appearance. Because of the extreme volatility of carbon dioxide, it has a tendency to generate very high vapor pressures even at moderate temperatures. As a result, the inventors have found that it is difficult to sufficiently cool the polymer melt/blowing agent mixture in second extruder 20 to prevent the rapid diffusion of the carbon dioxide from the foam. However, use of one or more of the foregoing additives in accordance with the present invention appears to "lubricate" the polymer so that the carbon dioxide can mix with and dissolve in the polymer melt with less heat-generation due to a decrease in the frictional forces (sheer energy) within the polymer melt. Thus, the viscosity of the polymer melt and vapor pressure of the blowing agent can be better controlled. In this manner, the carbon dioxide expands into smaller, more uniform cells as the foam tube exits the die without rupturing the cells and producing cracks and/or corrugation on the surface of the foam. As a result, the foams which are produced in accordance with the present invention are of high quality, i.e., they have a high degree of cell integrity and a smooth, aesthetically-pleasing surface appearance.

Unexpectedly, the additives also allow a thicker, lower density foam to be produced from a carbon dioxide blowing agent without corrugation. It has generally been found that as foams made with carbon dioxide are made less dense and more thick, the severity of corrugation increases. The use of one or more of the above additives in accordance with the present invention, however, has been found to prevent this from occurring so that thick (i.e., 120 to 150 mils) foams can be made with a carbon dioxide blowing agent without corrugation.

In one embodiment of the present invention, the additive which is added to the polymer melt is polysiloxane. A preferred polysiloxane is polydimethylsiloxane. A particularly preferred polysiloxane is an organomodified polydimethylsiloxane which is available from Union Carbide Chemicals and Plastics Company, Inc. under the tradename UCARSIL™ PA-1.

PA-1 may be obtained in a linear low density polyethylene carrier, along with diatomaceous earth and silica, from the Specialty Polymer Corporation, P.O. Box 249, Dunbar, W. Va., under the tradename SPC-D55. SPC-D55 has been found to act as a nucleator (as well as improving the quality of the foam due to its PA-1 content). Thus, additional nucleating agents, such as citric acid or sodium bicarbonate, are not needed when SPC-D55 (organomodified polydimethylsiloxane, along with diatomaceous earth and silica) is used as an additive in the process of the present invention.

The polysiloxane may be present in the polymer melt in any effective amount which achieves a desired level of foam quality. Preferably, the polysiloxane is present in the polymer melt at a weight percentage of 1.0 or less and, more preferably, ranges from about $2 \times 10^{-5}$ to about 0.01 weight percent, based on the weight of the polymer melt.

In another embodiment of the present invention, mineral oil, i.e., a liquid petroleum derivative or extract, is used as an additive in the production of foams from a carbon dioxide blowing agent. Any mineral oil may be used. The mineral oil may be present in the polymer melt in any effective amount which achieves a desired level of foam quality, but preferably ranges from about 0.03 to about 0.5 weight percent, based on the weight of the polymer melt. More preferably, the mineral oil is present at a weight percentage of about 0.2. In addition to improving the quality of foams made from a carbon dioxide blowing agent, mineral oil has advantageously been found to improve the flexibility of the foam so that the foam is less brittle.

In a most preferred embodiment, both polysiloxane and mineral oil are added to the polymer melt within the respective weight percentage ranges given above for each additive.

In yet another embodiment of the present invention, one or more polyolefins are included with the polymer melt along with polysiloxanes and/or mineral oil. The polyolefins may be selected from the group consisting of ethylene/alpha-olefin copolymer, polypropylene, propylene/ethylene copolymer, ethylene/vinyl acetate copolymer, and ethylene/vinyl alcohol copolymer. The polyolefins may be present in the polymer melt in any effective amount which achieves a desired level of foam quality, but preferably ranges from about 1 to about 15 weight percent, based on the weight of the polymer melt. More preferably, the polyolefin is added at a weight percentage of about 8.5.

Referring again to FIG. 1, the introduction of the additives of the present invention to the polymer melt will be described. In general, the additives may be added to the polymer melt at any convenient point in the process. More preferably, however, the additives are added to the polymer melt either concurrently with or prior to the addition of the carbon dioxide blowing agent at injection port 14.

In the case of polysiloxane, it is preferred that this additive be added to the polymer melt prior to adding the carbon dioxide blowing agent. This is most conveniently accomplished by adding the polysiloxane to first extruder 10 at hopper 12 along with the thermoplastic polymer. This can be done either by mixing the polysiloxane (or the polysiloxane mixture in SPC-D55) with the polymer pellets prior to adding the polymer to the hopper, or by adding the polysiloxane to the hopper concurrently with but separately from the polymer.

In the case of mineral oil, it is preferred that this additive be added to the polymer melt concurrently with the addition of the carbon dioxide blowing agent at injection port 14. To this end, a "tee" fitting (not shown) can be attached to injection port 14 whereby carbon dioxide enters the injection port through one "branch" of the tee while mineral oil enters the injection port through another branch of the tee. Both carbon dioxide and mineral oil are preferably transported to injection port 14 by separate pumping systems which generate pressures of between about 5,000 to 5,500 psi. At such pressures, desired volumes of carbon dioxide and mineral oil can be supplied to the polymer melt.

Polyolefin is most conveniently provided to the polymer melt in the form of pellets of "barrier foam tray" scrap which is being recycled and added to hopper 12, either alone or as a mixture with pellets of "virgin" thermoplastic polymer, for processing into a foam in accordance with the method of the present invention. A barrier foam tray is a foam packaging tray to which a flexible oxygen-barrier film is adhered, thereby providing a packaging tray with oxygen-barrier functionality. Barrier foam trays are described in, e.g., U.S. Pat. Nos. 4,847,148 and 4,935,089, and in copending U.S. Ser. No. 08/326,176, the disclosures of which are incorporated herein by reference.

The oxygen-barrier film typically contains one or more polyolefins, including polyolefin-based copolymers, such as ethylene/alpha-olefin copolymer, polypropylene, propylene/ethylene copolymer, ethylene/vinyl acetate copolymer, and ethylene/vinyl alcohol copolymer (a preferred oxygen-barrier material). Preferred oxygen-barrier films for adherence to a foam packaging tray include a bonding layer (the layer which is contact with and provides adherence to the foam tray) of styrene/butadiene copolymer and/or ethylene/vinyl acetate copolymer; an oxygen-barrier layer of ethylene/vinyl alcohol copolymer, vinylidene chloride and copolymers thereof, acrylonitrile, and/or polyamide; and an outer layer of polyethylene, polypropylene, propylene/ethylene copolymer, and ethylene/alpha-olefin copolymer, including both homogeneous and heterogeneous ethylene/alpha-olefin copolymers, such as linear low density polyethylene. Other internal layers of, e.g., polyolefins including olefin copolymers such as linear low density polyethylene or ethylene/vinyl acetate copolymer, may be included in the oxygen-barrier film to impart desired processing advantages or end-use characteristics.

A particularly preferred oxygen-barrier film for adherence to a polystyrene foam tray includes a bonding layer of styrene/butadiene copolymer, an oxygen-barrier layer of ethylene/vinyl alcohol copolymer, and an outer layer of linear low density polyethylene or styrene/butadiene copolymer.

In the production of barrier foam trays, foam sheets are produced as described above. A flexible oxygen-barrier film is then adhered to the foam sheet, generally by laminating the film to the foam sheet under heat and pressure with either corona treatment or with a suitable adhesive. The resultant foam sheet/film composite is then thermoformed into trays or the like and the trays are cut from the sheet. The remaining portion of the sheet, i.e., after the trays have been cut and removed therefrom, becomes scrap which is desirably recycled. Other recyclable scrap comes from trays which are rejected for quality-control reasons and from the extruders as a result of start-ups and size and color changes. The scrap is ground and pelletized, thereby creating "reclaim pellets." The reclaim pellets comprise the material from which the foam sheet was formed, e.g., polystyrene, as well as the polyolefins and other materials from which the oxygen-barrier film was made. These reclaim pellets are then placed into hopper 12, with or without virgin polymer pellets, and extruded and foamed into a foam sheet which contains polyolefins as well as the thermoplastic polymer from which the foam is primarily formed. The foregoing recycle process is described in further detail in U.S. Pat. Nos. 5,118,561 and 5,330,596, the disclosures of which are incorporated herein by reference.

It has been surprisingly and unexpectedly found that foams made from recycled barrier foam trays as described immediately above by use of a carbon dioxide blowing agent, and specifically a 100% carbon dioxide blowing agent, are superior to carbon dioxide foams which are made from virgin polymer (i.e., with no recycled barrier foam material and, therefore, no polyolefin). That is, the polyolefin which is added to the polymer melt via the reclaim pellets has been found to eliminate or reduce the incidence of surface cracks, corrugation, and cell rupture. This improvement is particularly pronounced when polysiloxane and/or mineral oil are also present in the polymer melt. If desired, pure polyolefin, i.e., not in the form of reclaim pellets, may be added to the polymer melt.

Regardless of which of the above additives or combination of additives is used, the process of the present invention results in a thermoplastic foam, preferably a foam sheet, which comprises a polymeric matrix containing a thermoplastic polymer and one or more materials selected from the group consisting of polysiloxane, mineral oil and, optionally, polyolefin. A plurality of (non-ruptured) cells are uniformly dispersed throughout the polymeric matrix which, at least immediately after foaming, contain a carbon dioxide blowing agent which is preferably 100% carbon dioxide. The cells preferably have a size which ranges from about 0.25 to about 0.45 millimeters. However, larger or smaller cells can be formed, depending upon the particular thermoplastic polymer, the blowing agent, the additive, the processing conditions, etc. The thickness of the foam sheet can range from about 40 to about 200 mils, but preferably ranges from about from about 100 to about 140 mils (1 mil=0.001 inch).

The foam sheet can be thermoformed into a variety of foamed articles such as packaging trays or bowls for, e.g., meat, poultry, produce, cheese, etc. Depending upon the oxygen-sensitivity of the product being packaged, it may be desirable that the foamed article have an oxygen-barrier film adhered thereto as described above.

The invention will now be more specifically described in the following examples, which are intended to be illustrative only and not limiting in scope.

EXAMPLES

In each of the following examples, foam sheets were made in accordance with the preferred extrusion/foaming method described above and illustrated in FIGS. 1 and 2. In the examples, "quality" of the foamed sheet product or thermoformed article refers to a qualitative, numerical scale ranging from 1 to 5 wherein 1 indicates poor quality and 5 indicates excellent quality

Example 1 Comparative

Carbon Dioxide Blowing Agent With No Additives

Polymer
a. Composition: Polystyrene
b. Flow rate: 695 pounds per hour (PPH)
Blowing Agent
a. Composition: 100% $CO_2$
b. Amount: 2.8 weight percent (based on the flow rate of polystyrene)
Additive
None
Nucleating Agents
a. Citric acid—0.7 PPH
b. Sodium bicarbonate—0.49 PPH
Process Conditions
a. Primary extruder
 1) Temperature range: 355–415° F.
 2) Pressure: 3600 psi
b. Secondary extruder
 1) Temperature range: 180–270° F.
 2) Pressure: 3700 psi
c. Die
 1) Temperature: 270° F.
 2) Pressure: 2500 psi
Foamed Sheet Product
a. Average cell size: 0.25 mm
b. Average sheet thickness: 100 mils
c. Quality
 1) Corrugation: 2
 2) Open cells: 1
 3) Surface cracks: 2
Thermoforming
Not attempted

Example 2

Polymer
a. Composition: Polystyrene
b. Flow rate: 779 pounds per hour (PPH)
Blowing Agent
a. Composition: 100% $CO_2$
b. Amount: 3.3 weight percent (based on the flow rate of polystyrene)
Additive
a. Composition: Mineral oil
b. Amount: 20–25 PPH
Nucleating Agents
a. Composition: Citric acid and sodium bicarbonate
b. Amount: 0.025 weight percent (based on the flow rate of polystyrene)
Process Conditions
a. Primary extruder
 1) Temperature range: 356–444° F.
 2) Pressure: 2923 psi
b. Secondary extruder
 1) Temperature range: 150–270° F.
 2) Pressure: 2183 psi c. Die
  1) Temperature: 260° F.
  2) Pressure: 1348 psi
Foamed Sheet Product
a. Average cell size: 0.1225 mm
b. Average sheet thickness: 74 mils
c. Quality
  1) Corrugation: 3
  2) Open cells: 3
  3) Surface cracks: 3
Thermoforming
Not attempted.

Example 3

Polymer
a. Composition: Polystyrene
b. Flow rate: 238 pounds per hour (PPH)
Blowing Agent
a. Composition: 100% $CO_2$
b. Amount: 1.5 weight percent (based on the flow rate of polystyrene)
Additive
a. Composition: organomodified polydimethylsiloxane (UCARSIL™ PA-1 from Union Carbide), blended with LLDPE, diatomaceous earth, and silica (from Specialty Polymer Corp. under the tradename SPC-D55)
b. Amount: $8 \times 10^{-4}$ weight percent (based on the flow rate of polystyrene)
Nucleating Agents
None
Process Conditions
a. Primary extruder
  1) Temperature range: 295–355° F.
  2) Pressure: 3000 psi
b. Secondary extruder
  1) Temperature range: 182–212° F.
  2) Pressure: 2900 psi
c. Die
  1) Temperature: 310° F.
  2) Pressure: 2000 psi
Foamed Sheet Product
a. Average cell size: 0.35–0.41 mm
b. Average sheet thickness: 140 mils
c. Quality
  1) Corrugation: 3
  2) Open cells: 3
  3) Surface cracks: 4
Thermoforming
a. Thermoformed article: Tray
b. Quality: 4

Example 4

Polymer
a. Composition: Polystyrene
b. Flow rate: 240 pounds per hour (PPH)
Blowing Agent
a. Composition: 100% $CO_2$
b. Amount: 1.5 weight percent (based on the flow rate of polystyrene)
Additive—Blend Of:
a. Organomodified polydimethylsiloxane (UCARSIL™ PA-1 from Union Carbide), blended with LLDPE, diatomaceous earth, and silica (from Specialty Polymer Corp. under the tradename SPC-D55); present in polymer melt at 0.0025 weight percent (based on the flow rate of polystyrene)
b. Mineral oil; present in polymer melt at 0.2 weight percent (based on the flow rate of polystyrene)
Nucleating Agents
None
Process Conditions
a. Primary extruder
  1) Temperature range: 297–349° F.
  2) Pressure: 3100 psi
b. Secondary extruder
  1) Temperature range: 164–196° F.
  2) Pressure: 2900 psi
c. Die
  1) Temperature range: 278–302° F.
Foamed Sheet Product
a. Average cell size: 0.37–0.47 mm
b. Average sheet thickness: 140 mils
c. Quality
  1) Corrugation: 5
  2) Open cells: 5
  3) Surface cracks: 5
Thermoforming
a. Thermoformed article: Tray
b. Quality: 5

Example 5

Polymer
a. Composition: Polystyrene
b. Flow rate: 250 pounds per hour (PPH)
Blowing Agent
a. Composition: 100% $CO_2$
b. Amount: 2.4 weight percent (based on the flow rate of polystyrene)
Additive—Blend Of:
a. Polyolefin; Present in polymer melt at 15 weight percent (based on the flow rate of polystyrene)
b. Mineral oil; Present in polymer melt at 0.4 weight percent (based on the flow rate of polystyrene)
Nucleating Agent
a. Composition: talc
b. Amount: 0.19 weight percent (based on the flow rate of polystyrene)
Process Conditions
a. Primary extruder
  1) Temperature range: 250–348° F.
  2) Pressure: 2300 psi
b. Secondary extruder
  1) Temperature range: 174–217° F.
  2) Pressure: 2300 psi
c. Die
  1) Temperature range: 306–314° F.
  2) Pressure: 1900 psi
Foamed Sheet Product
a. Average sheet thickness: 125 mils
b. Quality
  1) Corrugation: 4
  2) Surface cracks: 4
Thermoforming
a. Thermoformed article: Tray
b. Quality: 3

The foregoing examples demonstrate that $CO_2$ foams made with an additive in accordance with the present invention are superior to $CO_2$ foams made without such additives.

While the invention has been described with reference to illustrative examples, those skilled in the art will understand that various modifications may be made to the invention as described without departing from the scope of the claims which follow.

What is claimed is:

1. A thermoplastic foam, comprising:
   (a) a polymeric matrix comprising a thermoplastic olefin polymer, a polysiloxane, and
   (b) a plurality of cells dispersed throughout said polymeric matrix and containing a blowing agent comprising carbon dioxide.

2. The thermoplastic foam of claim 1, wherein said blowing agent consists essentially of carbon dioxide.

3. The thermoplastic foam of claim 1, wherein said thermoplastic foam is a thermoformed article.

4. The thermoplastic foam of claim 1, wherein said thermoplastic foam contains a plurality of cells having a size which ranges from about 0.25 to about 0.45 millimeters.

5. The thermoplastic foam of claim 1, wherein said thermoplastic polymer is selected from the group consisting of polystyrene, and polypropylene, and polyethylene terephthalate.

6. The thermoplastic foam of claim 1, wherein said polysiloxane is a polydimethylsiloxane modified with an organic compound.

7. The thermoplastic foam of claim 1, wherein both a mixture of polysiloxane and mineral oil are present in said polymeric matrix.

8. The thermoplastic foam of claim 1, wherein said polymeric matrix is selected from the group consisting of ethylene/alpha-olefin copolymer, polypropylene, propylene/ethylene copolymer, ethylene/vinyl acetate copolymer, and ethylene/vinyl alcohol copolymer.

* * * * *